United States Patent
Sung

(10) Patent No.: US 10,343,676 B2
(45) Date of Patent: Jul. 9, 2019

(54) SYNCHRONIZATION CONTROL METHOD FOR ENGINE CLUTCH LOCK-UP IN HYBRID ELECTRIC VEHICLE

(71) Applicant: HYUNDAI MOTOR COMPANY, Seoul (KR)

(72) Inventor: Byung Jun Sung, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 505 days.

(21) Appl. No.: 14/843,978

(22) Filed: Sep. 2, 2015

(65) Prior Publication Data

US 2016/0121880 A1 May 5, 2016

(30) Foreign Application Priority Data

Oct. 29, 2014 (KR) .......................... 10-2014-0147856

(51) Int. Cl.

| B60W 20/40 | (2016.01) |
| B60W 10/02 | (2006.01) |
| B60W 10/06 | (2006.01) |
| B60W 10/08 | (2006.01) |
| B60K 6/26 | (2007.10) |
| B60K 6/387 | (2007.10) |

(Continued)

(52) U.S. Cl.
CPC ............... *B60W 20/40* (2013.01); *B60K 6/26* (2013.01); *B60K 6/387* (2013.01); *B60K 6/40* (2013.01); *B60K 6/442* (2013.01); *B60K 6/48* (2013.01); *B60W 10/02* (2013.01); *B60W 10/06* (2013.01); *B60W 10/08* (2013.01); *B60K 2006/4825* (2013.01); *B60W 2510/0208* (2013.01); *B60W 2510/1005* (2013.01); *B60W 2710/0644* (2013.01); *B60W 2710/081* (2013.01); *Y02T 10/6221* (2013.01); *Y02T 10/6234* (2013.01); *Y02T 10/6252* (2013.01); *Y10S 903/912* (2013.01); *Y10S 903/93* (2013.01)

(58) Field of Classification Search
CPC ..................................................... B60W 20/40
See application file for complete search history.

(56) References Cited

U.S. PATENT DOCUMENTS 8,251,865 B2    8/2012   Kaltenbach et al.

FOREIGN PATENT DOCUMENTS

| JP | 2006-205900 A | 8/2006 |
| JP | 2006-315484 A | 11/2006 |

(Continued)

*Primary Examiner* — Erin D Bishop
(74) *Attorney, Agent, or Firm* — Morgan Lewis & Bockius LLP

(57) ABSTRACT

A synchronization control method includes controlling an engine speed to follow a motor speed as a target speed of the engine when synchronization between the engine speed and the motor speed starts according to a demand for the lock-up of the engine clutch while travelling under the EV mode with the engine clutch opened; estimating the engine speed at a time of a transmission gear ratio change at which the motor speed increases and reaches a preset motor speed, wherein the transmission gear ratio change is carried out at the preset motor speed; calculating the motor speed, which is reduced after the transmission gear ratio change, by using the preset motor speed and information on a gear ratio before and after the transmission gear ratio change; and controlling the engine speed by resetting the target speed to the calculated motor speed as a new target speed of the engine.

9 Claims, 4 Drawing Sheets

(51) Int. Cl.
  *B60K 6/40*  (2007.10)
  *B60K 6/442*  (2007.10)
  *B60K 6/48*  (2007.10)

(56) References Cited

FOREIGN PATENT DOCUMENTS

| | | |
|---|---|---|
| JP | 2009-067225 A | 4/2009 |
| JP | 2010-215189 A | 9/2010 |
| KR | 10-2009-0062246 A | 6/2009 |
| KR | 10-2011-0061337 A | 6/2011 |
| KR | 10-2014-0020498 A | 2/2014 |
| KR | 10-1371748 B1 | 3/2014 |
| KR | 10-1481335 B1 | 1/2015 |

--PRIOR ART--

--PRIOR ART--

SYNCHRONIZATION CONTROL METHOD FOR ENGINE CLUTCH LOCK-UP IN HYBRID ELECTRIC VEHICLE

CROSS-REFERENCE TO RELATED APPLICATION

This application claims the benefit under 35 U. S. C. § 119(a) of Korean Patent Application No. 10-2014-0147856 filed on Oct. 29, 2014, the entire contents of which are incorporated herein by reference.

BACKGROUND

(a) Technical Field

The present invention relates generally to a control method for a hybrid electric vehicle, and more particularly to synchronization of engine speed (RPM) and motor speed (RPM) upon lock-up of an engine clutch of a hybrid electric vehicle.

(b) Background Art

In general, a hybrid electric vehicle travels using an engine and an electric motor as a driving power source. Since, in the hybrid electric vehicle, fossil fuel energy and electric energy are used together for travel, the hybrid electric vehicle is environmentally friendly to achieve reduction of exhaust gas and enhancement of fuel ratio.

FIG. 1 schematically shows a hybrid powertrain including an engine and a motor as a power source for travel in a hybrid electric vehicle, and an engine clutch and a transmission to transmit a driving force.

As shown in FIG. 1, the powertrain including a driving system such as an engine, a motor, and a power transmission in a hybrid electric vehicle, includes an engine 1 and a motor 3 disposed serially as a power source for travel, an engine clutch 2 disposed between the engine 1 and the driving motor 3 to transmit or cut off driving power, an inverter 5 for driving and controlling the motor 3, a transmission 4 for changing the driving power of the engine 1 and the motor 3 so as to transmit the changed driving power to a driving shaft, and a hybrid starter and generator (HSG) 7 connected to the engine 1 for transmission of the driving power to start the engine and generate electricity from the driving power.

A battery 6 as a power source (an electric power source) of the motor 3 is connected to the motor through the inverter 5 to charge and discharge.

The engine clutch 2 transmits and cuts off selectively the driving power between the engine 1 and the motor 3 by locking up and opening as needed using hydraulic pressure.

The transmission 4 is connected to an output side of the motor 3 to transmit driving power of the engine and the motor to a driving shaft of the vehicle. Transmission 4 may be a manual transmission (MT), an automatic transmission (AT), an automatic manual transmission (AMT), or a dual clutch transmission (DCT).

Moreover, the inverter 5 changes direct current of the battery 6 to three-phase alternating current, and feeds the changed current to the motor to drive the motor 3.

In a general hybrid electric vehicle, a travel mode is selected according to travelling conditions, such as a pure electric vehicle mode using only the driving power of the motor 3, that is, electric vehicle (EV) mode and a hybrid electric vehicle (HEV) mode using driving powers of the engine 1 and the driving motor 3 together.

Moreover, upon braking of a vehicle or coasting under inertia, a regeneration mode in which the braking energy and the inertia energy are collected by generation of the motor to charge the battery 6 is performed.

In addition, the HSG 7 serves as a generator due to the driving power of the engine 1 or due to a driving power transmitted through the engine under regeneration conditions to charge the battery 6.

Meanwhile, in the HEV mode, the engine clutch is locked up so that the vehicle travels with the sum of output torque from the engine and the motor, while in the EV mode, the engine clutch is opened so that the vehicle travels only with the output torque of the motor.

In addition, when the engine clutch is locked up in during transition from the EV mode to the HEV mode, synchronization between speeds at both ends of the engine clutch after cranking of the engine by the HSG, that is, synchronization between the engine speed (RPM) and the motor speed (RPM) is made. The engine clutch is locked up, and transition of the travel mode from the HEV mode is carried out.

As such, for easy lock-up of the engine clutch in the transition from the EV mode to the HEV mode, speed at an input end of the engine clutch connected to the output side of the engine must be synchronized with speed at the output end of the engine clutch connected to the input side of the motor. That is, the engine speed must be synchronized with the motor speed. This is necessary to prevent slip of the engine clutch speed difference between the engine and the motor when the engine clutch is locked up.

Synchronization is necessary to lock-up and separate between the engine and the motor in the hybrid system. A synchronization control strategy in the transition is important because power performance and fuel ratio of a vehicle are influenced by synchronization.

FIG. 2 is a view showing a problem of an existing synchronization control method, and shows motor speed at early starting of a vehicle and engine speed (RPM) controlled during the synchronization for the lock-up of the engine clutch.

Moreover, FIG. 2 shows an accelerator pedal position sensor (APS) signal to detect a position of the accelerator pedal when a driver steps on the accelerator pedal at early starting.

As shown, when a driver steps the accelerator pedal, early starting of the vehicle is performed by the driving power of a motor (an output torque) in a state in which the engine clutch is released (opened). After that, needed is a process of locking up the engine clutch to transmit the driving power (output torque) of an engine when demand torque of a vehicle increases as the driver steps on the accelerator pedal (lock-up of the engine clutch for switch into the HEV mode).

Additionally needed is a process of synchronizing engine speed with motor speed for lock-up of the engine clutch, and at this time, engine speed follows motor speed as a target speed.

Moreover, when speed change is carried out as the engine follows the motor speed (a target speed), that is as engine speed is controlled to follow motor speed, the motor speed decreases sharply. At this time, since the target speed followed by the engine has sharply changed, performance thereafter is inferior.

That is, a zone arises where the engine speed increases toward the target speed (the motor speed) and sharply decreases (See a portion 'A' in FIG. 2). At this time, since response of the engine is not fast, delay of synchronization occurs.

When delay of synchronization occurs as described above, clutch lock-up and mode transition are delayed so that transmission of power is also late. As a result, power performance of a vehicle deteriorates.

SUMMARY OF THE DISCLOSURE

Accordingly, the present invention has been made in an effort to solve the above-mentioned problems, and it is an object of the present invention to provide a synchronization control method of a hybrid electric vehicle for improving synchronization delay that may occur during the speed change, lock-up and mode transition delay of an engine clutch, and poor vehicle driving power performance due to the delays in locking-up the engine clutch to transmit the engine driving power (in transition to a HEV mode) when demand torque increases upon vehicle acceleration such as upon early starting while a vehicle travels using the driving power of the motor and the engine clutch is separated.

In accordance with an aspect of the present invention, there is provided a synchronization control method for lock-up of an engine clutch of a hybrid electric vehicle, including: increasing engine speed by controlling motor speed toward a target speed when synchronization starts according to a demand for lock-up of an engine clutch during travelling of the hybrid electric vehicle using the driving power of a motor while the engine clutch is opened; estimating engine speed at a time of speed change when the motor speed increases and reaches a preset speed where a speed change is carried out; calculating motor speed after the speed change using the changed speed and information on gear ratio before and after the changed speed when the estimated engine speed at the time of speed change is less than the preset changed speed; and controlling the engine speed by changing the target speed to be equal to the motor speed after the speed change.

According to the synchronization control method of the present invention, change of motor speed after speed change is estimated during synchronization for the clutch lock-up, and the engine speed is controlled by controlling the motor speed after the estimated speed change. Fast lock-up of the engine clutch is carried out so that power performance of the vehicle thereby may be achieved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the figures.

DETAILED DESCRIPTION

Hereinafter, the present invention will be described in detail so that those skilled in the art to which the present invention pertains can easily carry out the present invention.

The present invention provides a synchronization control method for a hybrid electric vehicle by improving delay of synchronization that may occur during speed change, delay of lock-up and mode transition of an engine clutch, and inferior vehicle driving power performance due to delays in locking-up the engine clutch to transmit the engine driving power (upon transition to a HEV mode) when demand torque increases upon accelerated vehicle speed as may occur during early starting while a vehicle travels using the driving power of the motor with the engine clutch separated.

To this end, change of a target speed (a motor speed) is estimated in determination of whether an engine clutch is locked up, and the target speed for the engine speed is changed so as to reduce synchronization following time so that delay of clutch lock-up is improved and cut-off of a driving power is removed; thereby, power performance is enhanced.

Figure 1:
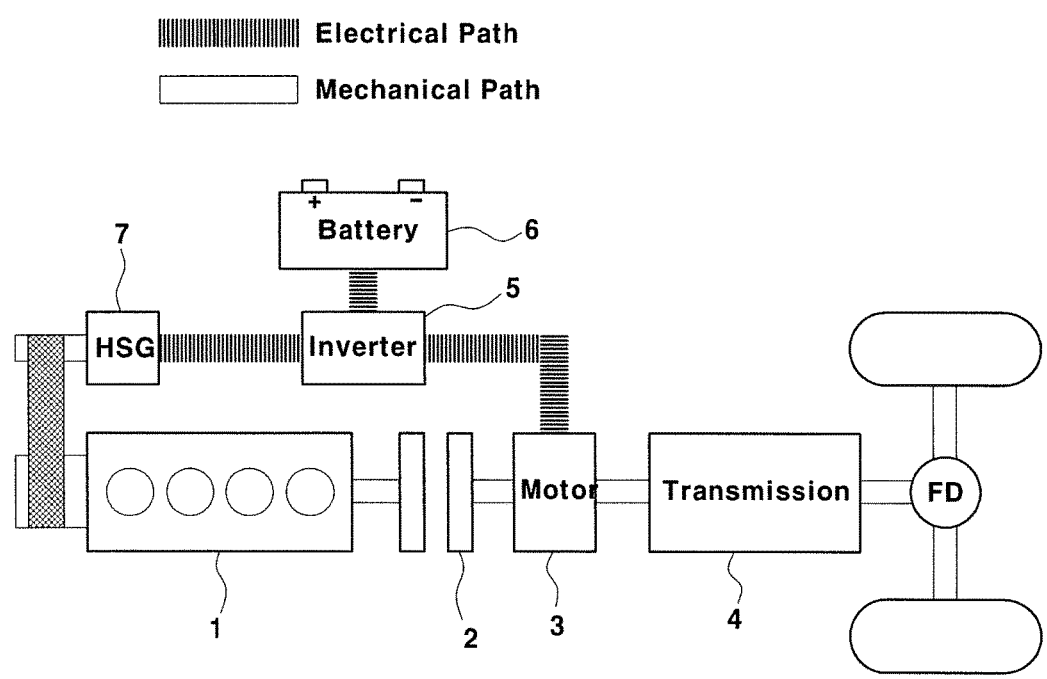
FIG. 1 is a schematic view showing a powertrain of a hybrid electric vehicle.
Figure 2:
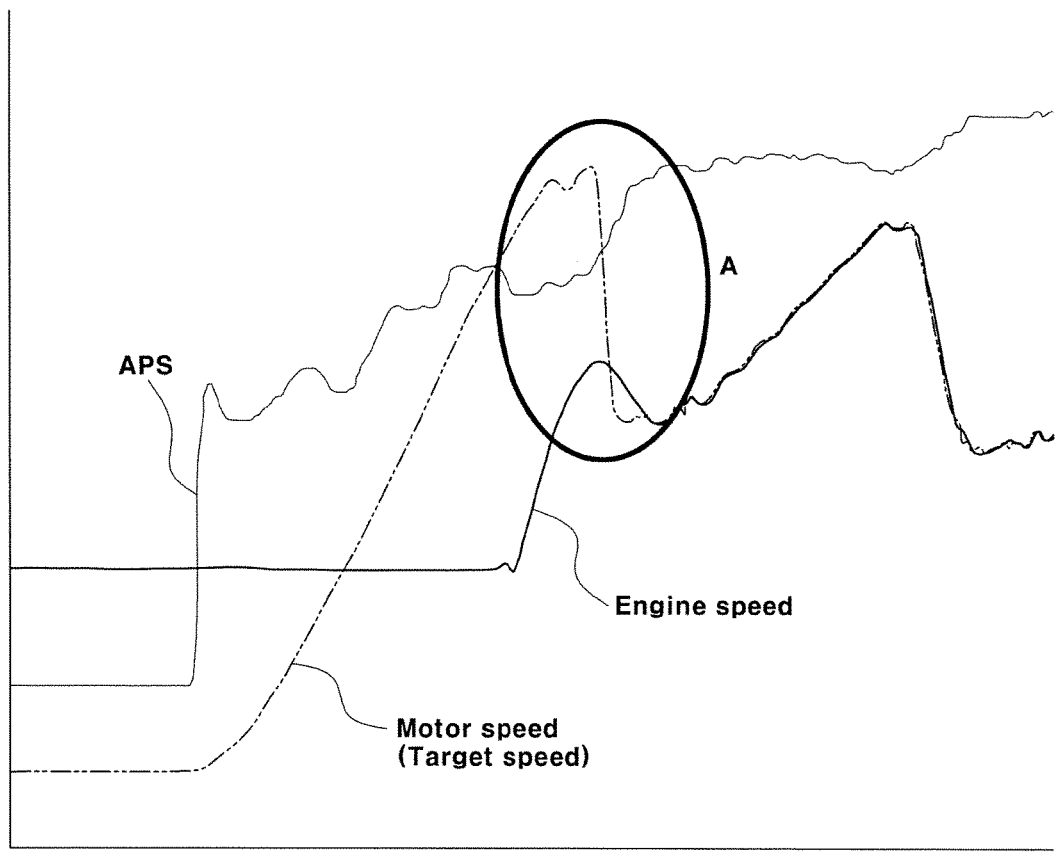
FIG. 2 is a view showing a problem occurring during an existing synchronization control.
Figure 3:
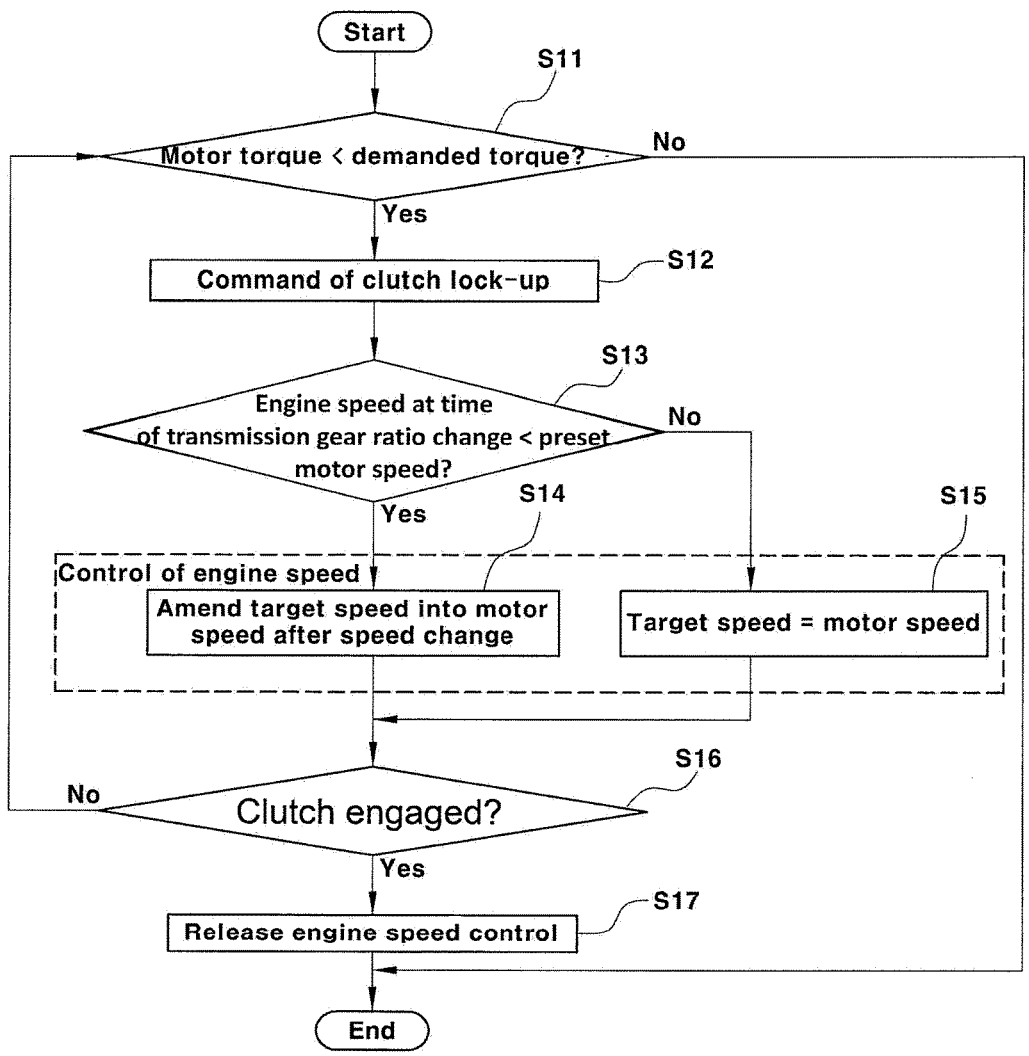
FIG. 3 is a flowchart illustrating a synchronization control according to an embodiment of the present invention.
Figure 4:
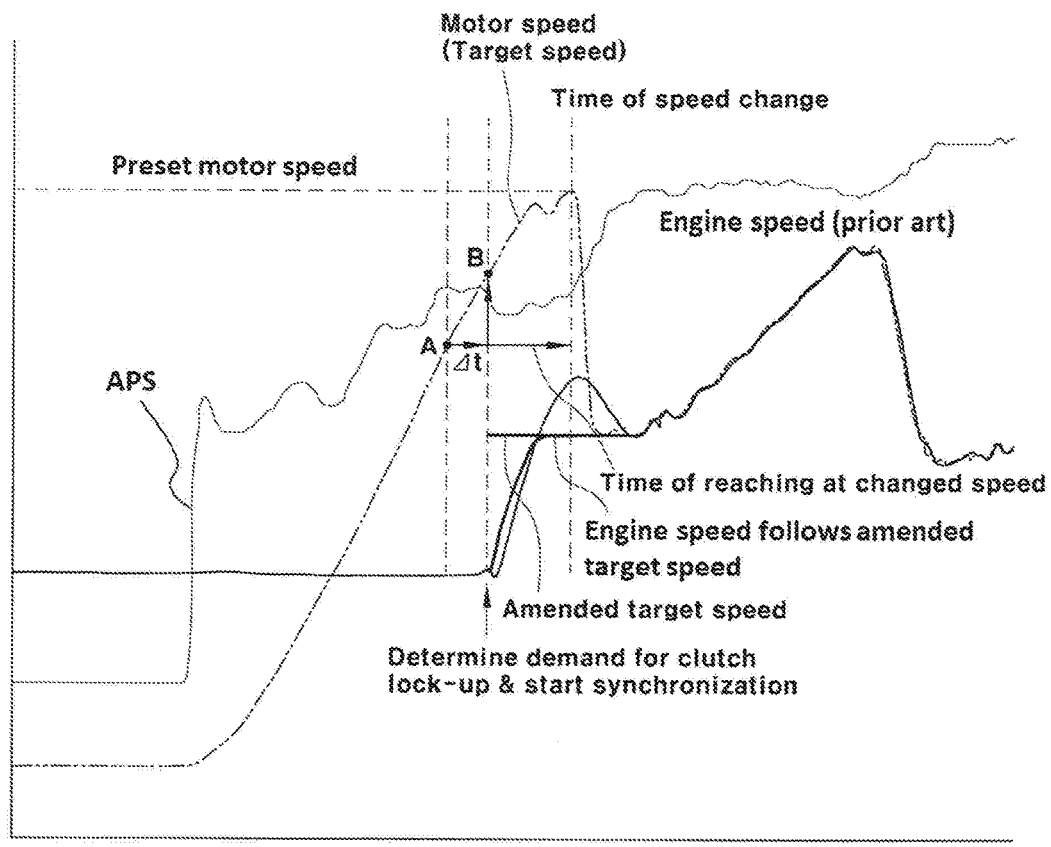
FIG. 4 is a view showing a state in which an engine speed is controlled during synchronization control according to the embodiment of the present invention.

FIG. 3 is a flowchart illustrating a synchronization control according to an embodiment of the present invention. FIG. 4 is a view showing a state when engine speed is controlled during synchronization control according to the embodiment of the present invention.

First, during an early starting as a vehicle travels with motor driving power with an engine clutch opened, it is necessary to accelerate a vehicle by a driver stepping on an accelerator pedal. If a demand torque, by which a driver steps on an accelerator pedal, is greater than the torque of a motor, a controller determines that lock-up of the engine clutch is needed, outputs an engine clutch lock-up command (S11 and S12) and starts synchronization between engine speed and motor speed.

In this case, the controller increases the engine speed assigning the motor speed as a target speed after starting of synchronization and calculates an estimated engine speed (RPM) at a transmission gear ratio change where the motor speed increases and reaches a preset motor speed (RPM).

In order to calculate the estimated engine speed at the transmission gear ratio change point, first, the rate of increase of motor speed at the time of determining demand of clutch lock-up and of starting of synchronization (speed change per unit time, that is, speed slope (RPM/s)), is calculated.

In other words, the rate of increase of motor speed that occurs by the stepping on an accelerator pedal by a driver is obtained. The rate of increase of motor speed may be calculated using motor speed (RPM) at two time points as motor speed increases.

In more detail, as shown in FIG. 4, the rate of increase may be obtained from motor speed RPM_A at time point A before synchronization, motor speed RPM_B at the start of synchronization, and time between time point A and time point B. An equation for the rate of increase of motor speed is following formula (1):

$$\text{increase rate of a motor speed} = (RPM\_B - RPM\_A)/\Delta t \qquad (1),$$

where time point B may be time of determining demand for clutch lock-up, that is, time of starting synchronization.

In addition, an estimate time s when the motor speed RPM_B at time of determining demand for clutch lock-up reaches the preset motor speed according to the rate of increase of a motor speed RPM/s, is described by the following formula (2):

time for reaching preset motor speed=(preset motor speed−RPM_B)/increase rate of a motor speed    (2), where RPM_B is a motor speed RPM at time point B, that is, motor speed at a time of synchronization.

At this time, the estimated engine speed RPM at the transmission gear ratio change is estimated by calculating engine speed at a time reaching the preset motor speed (time of transmission gear ratio change) with consideration of response characteristics RPM/s (engine properties) using the following formula (3), engine speed at transmission gear ratio change=response rate of an engine×time of reaching preset motor speed    (3).

When engine speed at the transmission gear ratio change, as shown in FIG. 3, occurs, the engine speed at the transmission gear ratio change is compared with the preset motor speed (S13).

In this case, when the engine speed at the transmission gear ratio change is less than the preset motor speed, the engine speed changes during the increase and the target speed (the motor speed) is sharply changed. Thus, when engine speed is controlled toward the motor speed as a target speed, it may be determined that a delay of synchronization occurs as in an existing synchronization control method.

When determining synchronization delay, the target speed for the control of the engine speed is altered using the preset motor speed and information of gear ratio before and after the transmission gear ratio change.

At this time, the motor speed decreased after the transmission gear ratio change, that is, the motor speed RPM at a target change gear step, is calculated. Here, the calculated motor speed is the speed decreasing when transmission gear ratio change is carried out. After this transmission gear ratio change, the motor speed is modified to the target speed to control engine speed (S14).

In this case, the motor speed RPM after the transmission gear ratio change may be calculated by the following formula (4), and engine speed is controlled with the calculated motor speed after the transmission gear ratio change to synchronize the motor speed with the engine speed, and then the clutch lock-up is completed (S16).

Motor speed after transmission gear ratio change=changed speed×(gear ratio at target change gear step/gear ratio at current change gear step)    (4)

As such, after completion of the clutch lock-up, engine speed control is released (S17).

In the step S13, when engine speed at the transmission gear ratio change time is greater than the preset motor speed, engine speed is controlled to follow the motor speed following the motor speed itself as a target speed (S15), and after that engine speed control is released when clutch lock-up is completed (S16 and S170).

By doing so, in the synchronization control method according to the embodiment of the present invention, change of a motor speed after transmission gear ratio change during synchronization for clutch lock-up is estimated and engine speed is controlled by following the estimated motor speed after the transmission gear ratio change so that speed of the clutch lock-up may be improved.

Although the present invention has been described in detail until now, the scope of the present invention is not limited to the description but various modifications made by those skilled in the art using the basic concept of the present invention defined by the claims also fall within the scope of the present invention.

What is claimed is:

1. A synchronization control method for lock-up of an engine clutch of a hybrid electric vehicle for transition from an electric vehicle (EV) mode using only driving power of a motor to a hybrid electric vehicle (HEV) mode using driving power of the motor and an engine together, the synchronization control method comprising steps of:
controlling an engine speed to follow a motor speed as a target speed of the engine when synchronization between the engine speed and the motor speed starts according to a demand for the lock-up of the engine clutch while the hybrid electric vehicle is travelling under the EV mode with the engine clutch opened;
estimating the engine speed at a time of a transmission gear ratio change at which the motor speed reaches a preset motor speed, wherein the transmission gear ratio change is carried out at the preset motor speed;
when the estimated engine speed at the time of the transmission gear ratio change is less than the preset motor speed, calculating the motor speed, which is reduced after the transmission gear ratio change, by using the preset motor speed and information on a gear ratio before and after the transmission gear ratio change; and
controlling the engine speed by resetting the target speed to the calculated motor speed as a new target speed of the engine.

2. The synchronization control method of claim 1, wherein the step of estimating the engine speed comprises:
calculating an increase rate of the motor speed;
calculating an estimated time that is taken from a starting time of synchronization until the motor speed reaches the preset motor speed according to the calculated increase rate of the motor speed; and
calculating the engine speed at the time of the transmission gear ratio change by using the calculated estimated time and a response rate of the engine when controlled to follow the motor speed as the target speed.

3. The synchronization control method of claim 2, wherein the increase rate of the motor speed (RPM/s) is calculated by the following formula (1) from motor speeds (RPM/s) at two time points during an increase of the motor speed, increase rate of motor speed=(RPM_B−RPM_A)/Δt    (1)

where RPM_A and RPM_B are corresponding motor speeds at time point A and time point B, respectively, and Δt is a time duration between the time point A and time point B.

4. The synchronization control method of claim 3, wherein the motor speeds at the two time points correspond to motor speeds during the increase of the motor speed as a driver steps on an accelerator pedal.

5. The synchronization control method of claim 3, wherein the time point A is a time point before the synchronization starts and the time point B is a time point at which the synchronization starts.

6. The synchronization control method of claim 2, wherein the estimated time that is taken from the starting time of synchronization until the motor speed reaches the preset motor speed is calculated by the following formula (2):

time for reaching preset motor speed=(preset motor speed−motor speed at starting time of synchronization)/increase rate of motor speed (2).

7. The synchronization control method of claim 2, wherein the engine speed (RPM) at the time of the transmission gear ratio change is obtained by a formula: 'engine speed at transmission gear ratio change=response rate of engine (RPM/s)×time (s) of reaching preset motor speed'.

8. The synchronization control method of claim 1, wherein the motor speed (RPM) after the transmission gear ratio change is obtained by the following formula: 'motor speed after transmission gear ratio change=changed preset motor speed×(gear ratio at target change gear step/gear ratio at a current change gear step)'.

9. The synchronization control method of claim 1, wherein, when the estimated engine speed at the time of the transmission gear ratio change is greater than the preset motor speed, the engine speed is controlled to follow the motor speed as a target speed without changing the target speed based on the transmission gear ratio change.

* * * * *